US012793255B2

(12) United States Patent
Aoki

(10) Patent No.: US 12,793,255 B2
(45) Date of Patent: Nov. 10, 2026

(54) ELECTRONIC APPARATUS FOR TRANSMITTING SEARCH REQUEST AND ACQUIRING LOCATION INFORMATION

(71) Applicant: CANON KABUSHIKI KAISHA, Tokyo (JP)

(72) Inventor: Hikaru Aoki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 18/636,738

(22) Filed: Apr. 16, 2024

(65) Prior Publication Data

US 2024/0265568 A1 Aug. 8, 2024

Related U.S. Application Data

(63) Continuation of application No. PCT/JP2022/030121, filed on Aug. 5, 2022.

(30) Foreign Application Priority Data

Oct. 25, 2021 (JP) ................................ 2021-173807

(51) Int. Cl.

| | |
|---|---|
| ***G06T 7/70*** | (2017.01) |
| ***G06F 3/14*** | (2006.01) |
| ***G06F 16/587*** | (2019.01) |
| ***H04L 67/52*** | (2022.01) |

(52) U.S. Cl.

CPC .................. *G06T 7/70* (2017.01); *G06F 3/14* (2013.01); *G06F 16/587* (2019.01); *H04L 67/52* (2022.05)

(58) Field of Classification Search

None

See application file for complete search history.

(56) References Cited

U.S. PATENT DOCUMENTS

| | | | |
|---|---|---|---|
| 11,164,227 | B2 | 11/2021 | Kaehler |
| 11,393,215 | B2 | 7/2022 | Sawada |
| 2012/0092329 | A1 | 4/2012 | Koo |

(Continued)

FOREIGN PATENT DOCUMENTS

| | | | |
|---|---|---|---|
| JP | 2002-329270 | A | 11/2002 |
| JP | 2004-177997 | A | 6/2004 |

(Continued)

OTHER PUBLICATIONS

Yagi, Takuma, et al. "GO-finder: a registration-free wearable system for assisting users in finding lost objects via hand-held object discovery." Proceedings of the 26th International Conference on Intelligent User Interfaces. (Year: 2021).*

(Continued)

*Primary Examiner* — SJ Park
*Assistant Examiner* — Caroline E. Depalma
(74) *Attorney, Agent, or Firm* — Venable LLP

(57) ABSTRACT

An electronic apparatus includes a request unit configured to transmit search request information including information of a search object, an acquisition unit configured to acquire location information indicating a location of a second apparatus at a time when the second apparatus has acquired a captured image through image capturing, and a specification unit configured to specify, in case where the search object is included in the captured image, a location of the search object based on the location information.

18 Claims, 10 Drawing Sheets

(56) References Cited

U.S. PATENT DOCUMENTS

| | | | | |
|---|---|---|---|---|
| 2012/0302256 | A1* | 11/2012 | Pai | H04W 4/023 455/456.2 |
| 2015/0146015 | A1* | 5/2015 | Sommerlade | F41G 1/345 348/187 |
| 2016/0034497 | A1* | 2/2016 | Ikeda | G06F 16/583 707/741 |
| 2016/0371548 | A1* | 12/2016 | Briggs | G06V 10/95 |
| 2017/0039613 | A1 | 2/2017 | Kaehler | |
| 2019/0147252 | A1* | 5/2019 | Sawada | B60K 35/60 348/148 |
| 2019/0163976 | A1* | 5/2019 | Fu | G06F 18/22 |
| 2020/0409537 | A1* | 12/2020 | Story | H04L 67/52 |
| 2021/0264164 | A1* | 8/2021 | Shimomura | G06N 20/00 |
| 2022/0005095 | A1 | 1/2022 | Kaehler | |

FOREIGN PATENT DOCUMENTS

| | | | |
|---|---|---|---|
| JP | 2016-051293 | A | 4/2016 |
| JP | 2019-091161 | A | 6/2019 |
| JP | 2020-181344 | A | 11/2020 |
| WO | 2012/051040 | A1 | 4/2012 |
| WO | 2016/210354 | A1 | 12/2016 |
| WO | 2020/100922 | A1 | 5/2020 |

OTHER PUBLICATIONS

Oct. 24, 2022 International Search Report in International Patent Appln. No. PCT/JP2022/030121.

Aug. 19, 2025 Japanese Official Action in Japanese Patent Appln. No. 2021-173807.

* cited by examiner

FIG. 4A

| | DISCLOSURE SETTING INFORMATION |
|---|---|
| REQUESTER | TO BE DISCLOSED |
| REQUESTER | NOT TO BE DISCLOSED |

FIG. 4B

| | DISPLAY SETTING INFORMATION | COOPERATION SETTING INFORMATION |
|---|---|---|
| COOPERATOR | TO BE DISPLAYED | ACCEPT |
| COOPERATOR | NOT TO BE DISPLAYED | ACCEPT |
| COOPERATOR | - | REJECT |

ELECTRONIC APPARATUS FOR TRANSMITTING SEARCH REQUEST AND ACQUIRING LOCATION INFORMATION

CROSS-REFERENCE TO RELATED APPLICATIONS

This application is a Continuation of International Patent Application No. PCT/JP 2022/030121, filed Aug. 5, 2022, which claims the benefit of Japanese Patent Application No. 2021-173807, filed Oct. 25, 2021, both of which are hereby incorporated by reference herein in their entirety.

BACKGROUND OF THE INVENTION

Field of the Invention

The present invention relates to an electronic apparatus, an information processing system, and a control method.

Background Art

As a technique for causing a user to perceive a sense different from reality by performing image processing on an image (captured image) acquired by imaging an object that exists in a real space, there is a cross reality (XR) technique. In addition, as a typical device for displaying an image to which the XR technique is applied, there is a head mount display (HMD), which is worn on a head of a person.

PTL 1 discloses a technique in which a captured image acquired by a camera mounted on an HMD is analyzed to display information of a product similar to a product presented in the captured image. PTL 2 discloses a technique for controlling a display in accordance with a result (recognition result) of character recognition performed on a captured image.

The location of an object (search object) for which a user is searching can be specified by analyzing a captured image acquired by a camera (electronic apparatus). However, even with the techniques of PTL 1 and PTL 2, since the captured image acquired by a camera worn by the user is used for analysis or character recognition, if the search object is not included in the captured image acquired by the camera, the location of the search object cannot be specified.

CITATION LIST

Patent Literature

PTL 1 WO 2016/210354
PTL 2 WO 2012/051040

SUMMARY OF THE INVENTION

Thus, it is an object of the present invention to provide a technique for easily specifying the location of a search object even when the search object is not included in a captured image acquired by a specific electronic apparatus.

According to one aspect of the present invention, an electronic apparatus serving as a first apparatus includes: a request unit configured to transmit search request information including information of a search object; an acquisition unit configured to acquire location information indicating a location of a second apparatus at a time when the second apparatus has acquired a captured image through image capturing; and a specification unit configured to specify, in case where the search object is included in the captured image, a location of the search object based on the location information.

According to one aspect of the present invention, an electronic apparatus includes: an acquisition unit configured to acquire search request information including information of a search object from a first apparatus; a determination unit configured to determine, based on the information of the search object, whether or not the search object is included in a captured image acquired by a second apparatus through image capturing; and a transmission unit configured to transmit, in case where the determination unit determines that the search object is included in the captured image, location information indicating a location of the second apparatus at a time when the second apparatus has acquired the captured image to the first apparatus.

According to one aspect of the present invention, an information processing system that includes a first apparatus and a second apparatus includes: a request unit configured to transmit search request information including information of a search object from the first apparatus; a determination unit configured to determine, based on the information of the search object, whether or not the search object is included in a captured image acquired by the second apparatus through image capturing; an acquisition unit configured to acquire location information indicating a location of the second apparatus at a time when the second apparatus has acquired the captured image through image capturing; and a specification unit configured to specify, in case where the search object is included in the captured image, a location of the search object based on the location information.

According to one aspect of the present invention, a control method of an electronic apparatus serving as a first apparatus includes the steps of: requesting by transmitting search request information including information of a search object; acquiring location information indicating a location of a second apparatus at a time when the second apparatus has acquired a captured image through image capturing; and specifying, in case where the search object is included in the captured image, a location of the search object based on the location information.

According to one aspect of the present invention, a control method of an electronic apparatus includes the steps of: acquiring search request information including information of a search object from a first apparatus; determining, based on the information of the search object, whether or not the search object is included in a captured image acquired by a second apparatus through image capturing; and transmitting, in case where the determining determines that the search object is included in the captured image, location information indicating a location of the second apparatus at a time when the second apparatus has acquired the captured image to the first apparatus.

According to one aspect of the present invention, a control method of an information processing system that includes a first apparatus and a second apparatus includes the steps of: requesting by transmitting search request information including information of a search object from the first apparatus; determining, based on the information of the search object, whether or not the search object is included in a captured image acquired by the second apparatus through image capturing; acquiring location information indicating a location of the second apparatus at a time when the second apparatus has acquired the captured image through image capturing; and specifying, in case where the search object is included in the captured image, a location of the search object based on the location information.

Further features of the present invention will become apparent from the following description of exemplary embodiments with reference to the attached drawings.

BRIEF DESCRIPTION OF THE DRAWINGS

FIG. 4A and FIG. 4B are diagrams for describing setting information according to Embodiment 1.

DESCRIPTION OF THE EMBODIMENTS

Figure 1A:
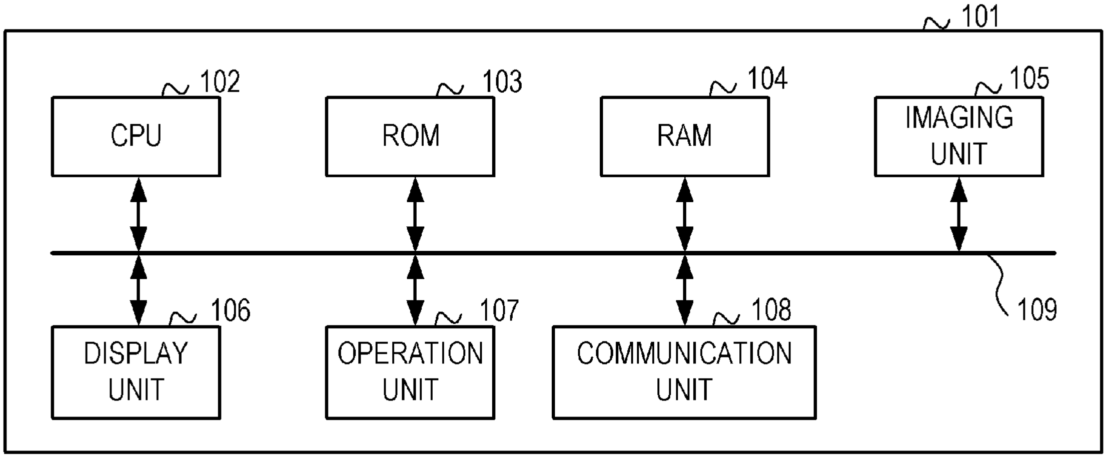
FIG. 1A and FIG. 1B are diagrams for describing an image processing apparatus according to Embodiment 1.

Hereinafter, embodiments of the present invention will be described in detail with reference to the accompanying drawings. The following embodiments do not limit the present invention according to the scope of claims, and all combinations of features described in the embodiments are not necessarily essential to solving units of the present invention. In addition, the same components are denoted by the same reference characters.

Embodiment 1

An example of a hardware configuration of an image processing apparatus 101 according to Embodiment 1 will be described with reference to FIG. 1A. The image processing apparatus 101 is an electronic apparatus (camera device) such as a smartphone, a tablet device, or a head-mounted display (HMD). In Embodiment 1, the image processing apparatus 101 will be described as an HMD. The image processing apparatus 101 includes a central processing unit (CPU) 102, a read-only memory (ROM) 103, a random access memory (RAM) 104, an imaging unit 105, a display unit 106, an operation unit 107, and a communication unit 108 as components. The components are connected with each other via a bus 109.

The CPU 102 is an arithmetic processing device that comprehensively controls the image processing apparatus 101. The CPU 102 executes various programs stored in the ROM 103 or the like to perform various kinds of processing.

The ROM 103 is a read-only non-volatile memory device that stores programs (such as image processing programs and initial data) and parameters that do not need to be changed.

The RAM 104 temporarily stores input information, calculation results in image processing, etc. The RAM 104 is a memory device that provides a working area to the CPU 102.

The imaging unit 105 is a camera that acquires an image (captured image) by imaging a real space. In Embodiment 1, the imaging unit 105 images a field of view of a user wearing an HMD serving as the image processing apparatus 101. This field of view is assumed to be a view that the user has when the user is not wearing the HMD.

The display unit 106 is a liquid crystal display or the like. The display unit 106 displays a captured image, a virtual object, a character, and/or an item (icon; content), etc.

The operation unit 107 is an operation unit including an operation member such as a power button or a dial.

The communication unit 108 performs data transmission and reception with an external device by wired communication or wireless communication (a wireless LAN, a local 5G, or the like). The communication unit 108 is a device compliant with communication standards such as Ethernet or IEEE 802.11.

The image processing apparatus 101 may be configured without the imaging unit 105 and the display unit 106. For example, there is an HMD including the imaging unit 105 and the display unit 106, which is provided separately from the image processing apparatus 101, and the image processing apparatus 101 may be a personal computer that controls the HMD (the imaging unit 105 and the display unit 106).

Figure 1B:
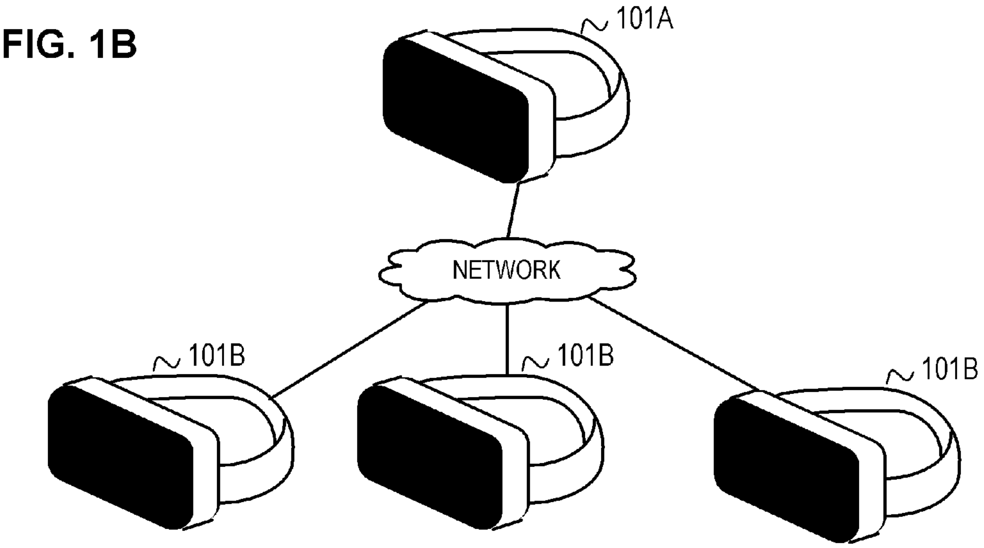

Hereinafter, the user of the image processing apparatus 101 who requests search cooperation (who makes a search request) is referred to as a "requester". The user of the image processing apparatus 101 to whom the search cooperation is requested is referred to as a "cooperator". As illustrated in FIG. 1B, the image processing apparatus 101 (image processing apparatus 101A) of the requester and the image processing apparatus 101 (image processing apparatus 101B) of at least one cooperator are connected to each other via a network to be able to communicate with each other. The image processing apparatus 101A of the requester and the image processing apparatus 101B of at least one cooperator may be collectively regarded as an information processing system.

(Functional Configuration of Image Processing Apparatus of Requester)

Figure 2:
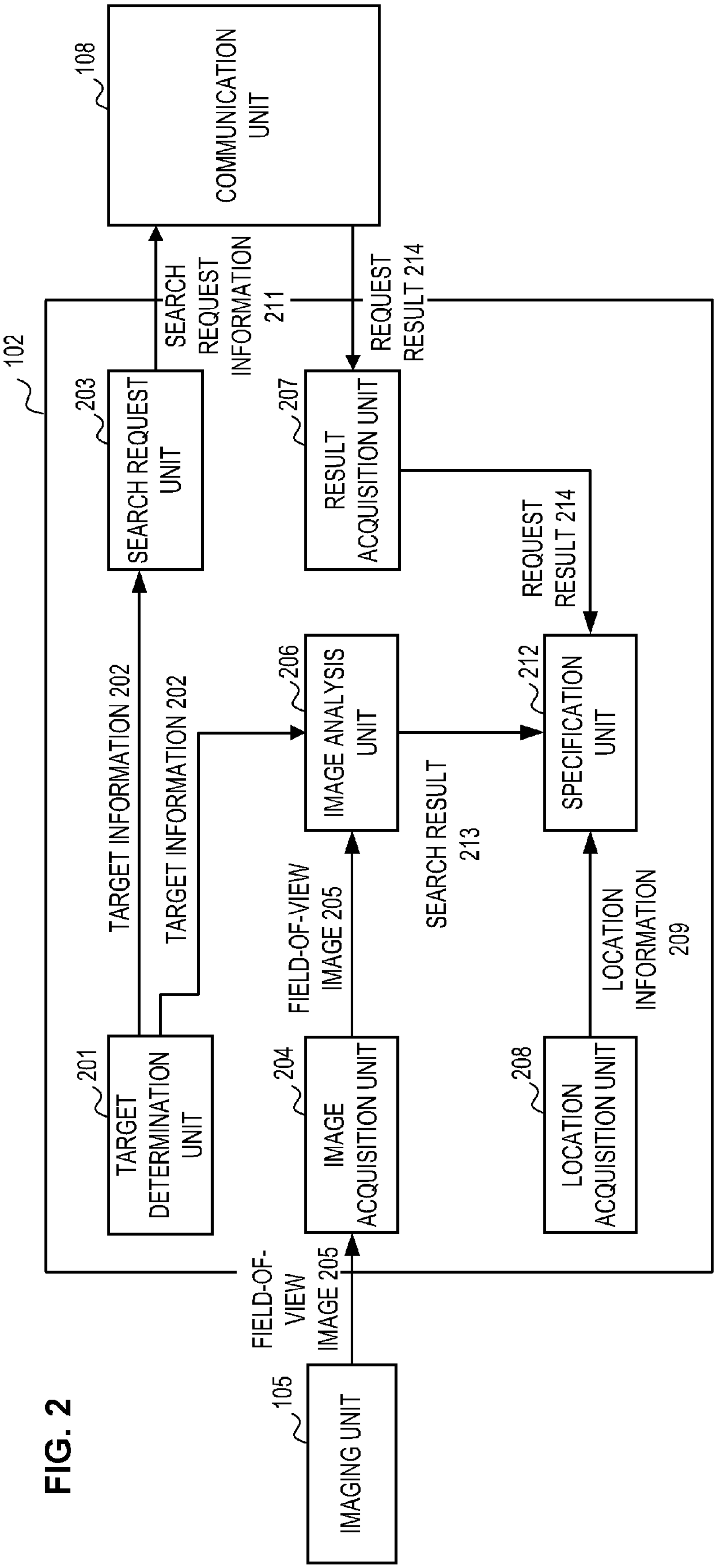
FIG. 2 is a diagram illustrating a functional configuration of an information processing apparatus of a requester according to Embodiment 1.

FIG. 2 is a block diagram illustrating a functional configuration of an image processing apparatus 101A of a "requester" according to the present embodiment. The image processing apparatus 101A includes a target determination unit 201, a search request unit 203, an image acquisition unit 204, an image analysis unit 206, a result acquisition unit 207, a location acquisition unit 208, and a specification unit 212. The processes performed by the functional configuration can be realized by the CPU 102 executing a program. Therefore, it can be said that the CPU 102 has this functional configuration. However, the CPU 102 does not need to perform all the processes.

For example, the image processing apparatus 101 may include a processing circuit dedicated to realize one or more processes. In the present embodiment, the individual components of the functional configuration may exchange information with the other components by any given method. For example, each component may temporarily store acquired or generated information in the RAM 104 so that the other components can acquire this information. That is, in the present embodiment, information may be exchanged between the components via the RAM 104. Further, each component may output the acquired or generated information to the other component without storing the information in the RAM 104.

The target determination unit 201 determines target information 202. The target information 202 is information of an object (search object) for which the requester wishes to search. The target information 202 is a key (search key) for seeking (searching for) a search object. The search object is, for example, a product or a person.

The search request unit 203 transmits search request information 211 including the target information 202 to the image processing apparatus 101B of the cooperator via the communication unit 108. In this way, the search request unit 203 makes a request to search (a request to cooperate in searching) for the search object to the image processing apparatus 101B. The search request unit 203 may request a search for the search object to a single image processing apparatus 101B or may request a search for the search object to a plurality of image processing apparatuses 101B.

The image acquisition unit 204 acquires a field-of-view image 205. The field-of-view image 205 is a captured image that the imaging unit 105 has acquired by imaging a field of view of the requester, which is assumed to be a view that the requester has when the requester is not wearing the HMD serving as the image processing apparatus 101A.

Figure 3:
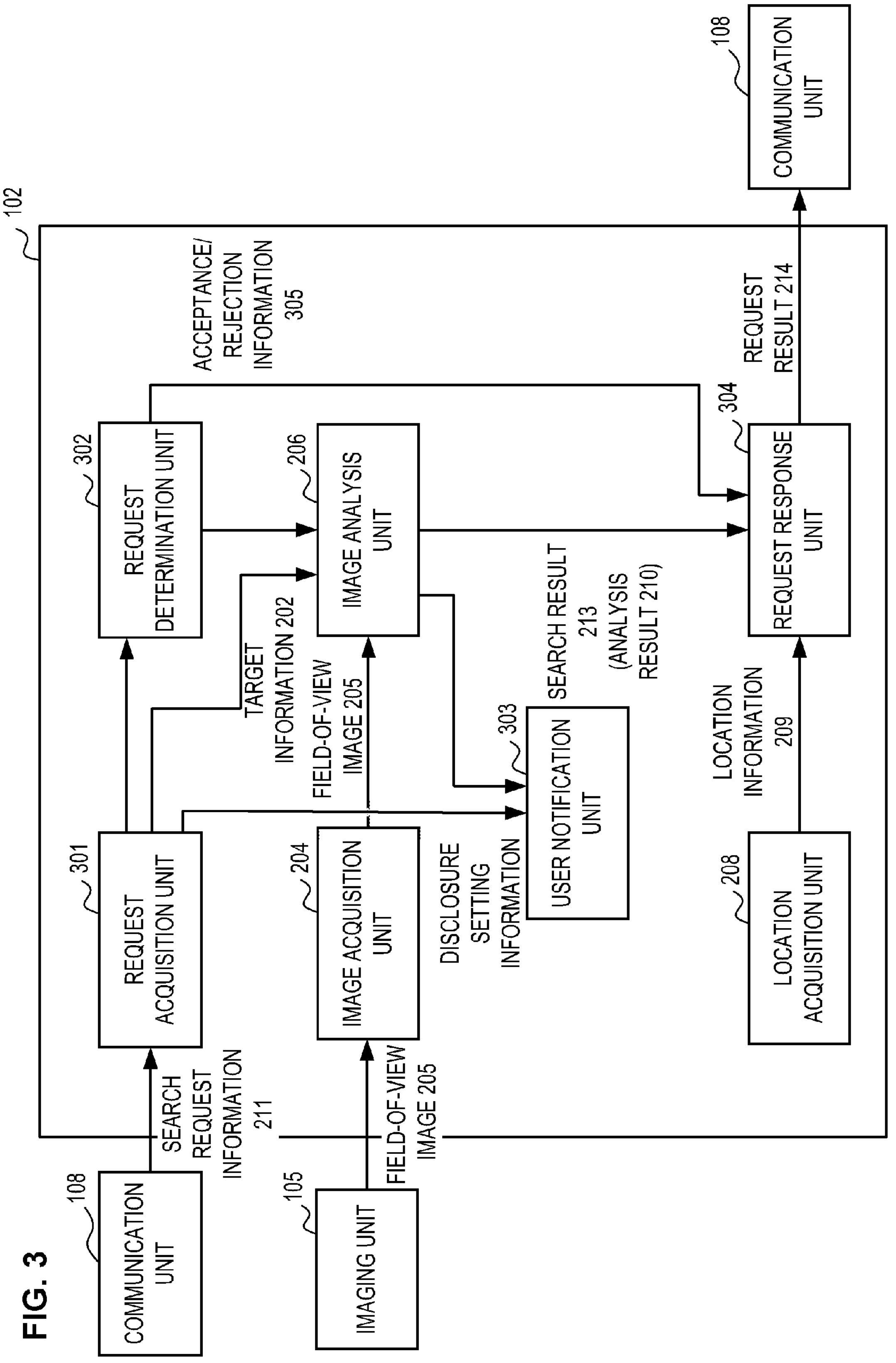
FIG. 3 is a diagram illustrating a functional configuration of an information processing apparatus of a cooperator according to Embodiment 1.

The image analysis unit 206 stores a result of an analysis performed on subjects included in the field-of-view image 205 in the RAM 104 as an analysis result 210 (see FIG. 3). The analysis result 210 is information for identifying each subject included in the field-of-view image 205. The image analysis unit 206 determines whether or not the search object is included in the field-of-view image 205 based on the analysis result 210 and the target information 202. The image analysis unit 206 then stores, in the RAM 104, a search result 213 indicating whether or not the search object is included in the field-of-view image 205. Therefore, the image analysis unit 206 is an analysis unit that analyzes an image as well as a determination unit that determines whether a specific subject is included in the image.

The result acquisition unit 207 acquires a request result 214 from the image processing apparatus 101B and stores the acquired request result 214 in the RAM 104. The request result 214 includes information indicating whether or not the image processing apparatus 101B has accepted the search request, information indicating whether or not the search object is included in a field-of-view image 205 (a search result 213 acquired by the image processing apparatus 101B), and location information 209 indicating the location of the image processing apparatus 101B. The request result 214 may include attitude information indicating the attitude of the image processing apparatus 101B. In the following description, the "location" may be information on latitude and longitude, may be a combination of information on latitude and longitude and information on altitude (height), or may be a concept that is abstract to some extent, such as "inside a facility". Therefore, the "location information" may be any information as long as an approximate location can be specified.

The location acquisition unit 208 acquires the location information 209 indicating the current location of the image processing apparatus 101A (requester) by using a GPS or an altimeter (by communicating with a GPS or an altimeter). The location acquisition unit 208 may be capable of acquiring attitude information that is information indicating the attitude of the image processing apparatus 101A by using a gyro sensor, an acceleration sensor, or the like.

The specification unit 212 specifies the location of the search object based on the search result 213 and the location information 209 (or based on the request result 214).

(Functional Configuration of Image Processing Apparatus of Cooperator)

FIG. 3 is a block diagram illustrating a functional configuration of the image processing apparatus 101B of the "cooperator" according to the present embodiment. The image processing apparatus 101B includes, as a functional configuration, a request acquisition unit 301, a request determination unit 302, a user notification unit 303, a request response unit 304, an image acquisition unit 204, an image analysis unit 206, and a location acquisition unit 208. The processes performed by this functional configuration can be realized by the CPU 102 executing a program. Therefore, it can be said that the CPU 102 has this functional configuration. However, the CPU 102 does not need to perform all the processes. For example, the image processing apparatus 101 may include a processing circuit dedicated to realize one or more processes. In the present embodiment, the individual components of this functional configuration may exchange information with the other components by any given method. For example, each component may temporarily store acquired or generated information in the RAM 104 so that the other components can acquire this information. That is, in the present embodiment, information may be exchanged between the components via the RAM 104. Further, each component may output the acquired or generated information to the other component without storing the information in the RAM 104.

The request acquisition unit 301 acquires the search request information 211 including the target information 202 from the image processing apparatus 101A via the communication unit 108. Thus, the request acquisition unit 301 receives the request to search (the request to cooperate in searching) for the search object from the image processing apparatus 101A.

The request determination unit 302 determines whether or not to accept (reject) the search request. The request determination unit 302 stores information indicating whether or not the search request has been accepted in the RAM 104 as acceptance/rejection information 305.

The user notification unit 303 notifies the cooperator of information of the search object (for example, displays the target information 202 on the display unit 106).

The request response unit 304 is a transmission unit that transmits the request result 214 to the requester. The request result 214 includes the location information 209 of the image processing apparatus 101B, the search result 213 (information indicating whether or not the search object is included in the field-of-view image 205 acquired by the image processing apparatus 101B), and the acceptance/rejection information 305. The request result 214 may include the analysis result 210 instead of the search result 213.

In the following description, the letter "A" is added to the end of the reference numeral assigned to the component or information of the image processing apparatus 101A, and the letter "B" is added to the end of the reference numeral assigned to the component or information of the image processing apparatus 101B. For example, the image acquisition unit 204 of the image processing apparatus 101A is referred to as the "image acquisition unit 204A". Note that, as for the target information 202, the search request information 211, and the request result 214, since the same information is used in the image processing apparatus 101A and the image processing apparatus 101B, neither the letter "A" nor "B" is added to the end of the reference numeral.

(Setting Information)

FIGS. 4A and 4B are diagrams for describing setting information that can be set by the requester or the cooperator operating the operation unit 107. FIG. 4A illustrates disclosure setting information indicating whether or not to disclose information of the search object to the cooperators. FIG. 4B illustrates display setting information indicating whether or not to display information of the search object, and cooperation setting information indicating whether or not to accept the search request. The disclosure setting information is stored in the RAM 104A, and the display setting information and the cooperation setting information are stored in the RAM 104B. The information of the search object may be the target information 202 or may be information indicating the location of the search object in a field-of-view image 205B.

The requester can set whether or not to disclose the information of the search object to the cooperator by setting the disclosure setting information to either "to be disclosed" or "not to be disclosed". The individual cooperator can set whether or not to display the information of the search object on the display unit 106B by setting the display setting information to either "to be displayed" or "not to be displayed". Further, the individual cooperator can set whether or not to accept the search request by setting the cooperation setting information to either "accept" or "reject". That is, the requester and the individual cooperators can change the setting of information handling in view of security and privacy. Further, for example, an incentive may be given if the cooperation setting information is set such that the cooperator accepts the search request so as to encourage the cooperator to actively cooperate in the search.

(Process on Requester Side)

A process (a specification process; a specification method; a control method of the image processing apparatus 101A) in which the image processing apparatus 101A specifies the location of a search object will be described with reference to the flowchart in FIG. 5. The process of the present flowchart is realized by the CPU 102A executing a control program according to the present flowchart.

In step S501, the target determination unit 201A determines target information 202 indicating a search object. The target information 202 is, for example, information of a character string (keyword) or an image specified by the user. The target determination unit 201A may determine information of an image of a specific subject captured in advance by the imaging unit 105 as the target information 202. The target determination unit 201A may determine input information provided by an external device such as a smartphone as the target information 202. The target determination unit 201A may determine information (information of a character string or an image) estimated on the basis of a past activity history of the requester as the target information 202. For example, if the requester performs an activity such as searching for a key of a warehouse at a specific time every day, the target determination unit 201A estimates (determines) an image of the key of the warehouse as the target information 202 based on the activity history when the specific time is reached.

In addition, instead of the information (the character string or the image) specified by the user, the target determination unit 201A may determine information associated with (based on) the information specified by the user as the target information 202. For example, when the user specifies an image of a key of a warehouse, if the key of the warehouse is normally kept in a specific shelf, an image of the specific shelf may be determined as the target information 202. In this case, the search object is not the key of the warehouse but the specific shelf. In this case, for example, the image of the key of the warehouse and the image of the specific shelf are associated with each other and stored in the RAM 104A.

In step S502, the image acquisition unit 204A acquires a field-of-view image 205A, which is an image of the field of view of the requester captured by the imaging unit 105A. The image analysis unit 206A analyzes the field-of-view image 205A to determine subjects included in the field-of-view image 205A. An existing object recognition technique or character recognition technique can be used for performing this analysis. The image analysis unit 206A stores information of each subject determined to be included in the field-of-view image 205A in the RAM 104A as an analysis result 210A.

In step S503, the image analysis unit 206A determines whether or not the search object is included in the field-of-view image 205A based on the target information 202 and the analysis result 210A. For example, the image analysis unit 206A determines whether or not the search object indicated by the target information 202 is included in the plurality of subjects indicated by the analysis result 210A, thereby determining whether or not the search object is included in the field-of-view image 205A. The image analysis unit 206A then stores, in the RAM 104A, a search result 213A indicating whether or not the search object is included in the field-of-view image 205A. If it is determined that the search object is included in the field-of-view image 205A, there is no need to make a search request to the image processing apparatus 101B, and the processing proceeds to step S507. If it is determined that the search object is not included in the field-of-view image 205A, the processing proceeds to step S504.

Alternatively, in step S502, the image analysis unit 206A may determine whether or not the search object is included in the field-of-view image 205A by analyzing the field-of-view image 205A based on the target information 202. In this case, the processing in step S503 is not performed, and if it is determined that the search object is included in the field-of-view image 205A, the processing proceeds to step S507, and if it is determined that the search object is not included in the field-of-view image 205, the processing proceeds to step S504.

In step S504, the search request unit 203A makes a search request to the image processing apparatus 101B, which is connected to the same network as the image processing apparatus 101A of the requester. Specifically, the search request unit 203A transmits search request information 211 including the target information 202 to the image processing apparatus 101B. In Embodiment 1, the search request information 211 includes the disclosure setting information (see FIG. 4A).

In step S505, the result acquisition unit 207A receives a request result 214 from the image processing apparatus 101B. The result acquisition unit 207A stores the request result 214 in the RAM 104.

In step S506, the specification unit 212A determines whether or not the search object is included in the field-of-view image 205B of the cooperator based on the request result 214 (a search result 213B). If it is determined that the search object is included in the field-of-view image 205B, the processing proceeds to step S507. If it is determined that the search object is not included in the field-of-view image 205B, the process of the present flowchart ends.

In step S507, the specification unit 212A specifies the location (locational coordinates) of the search object. For example, if it is determined in step S503 that the search object is included in the field-of-view image 205A, the specification unit 212A specifies the location of the search object based on location information 209A and the coordinates of the search object in the entire field-of-view image 205A. Since the location acquisition unit 208A stores the location information 209A in the RAM 104A, the specification unit 212A can acquire the location information 209A from the RAM 104A. On the other hand, for example, when the request result 214 (search result 213B) indicates that the search object is included in the field-of-view image 205B (YES in step S506), the specification unit 212A specifies the location of the image processing apparatus 101B as the location of the search object. In addition, for example, when the request result 214 indicates that the search object is included in the field-of-view image 205B, the specification unit 212A may specify the location (coordinates) of the search object based on the location (location information) and the attitude (attitude information) of the image processing apparatus 101B. Specifically, by determining the optical axis direction of the imaging unit 105B based on the attitude of the image processing apparatus 101B, the specification unit 212A can specify that the search object is located at a location in the optical axis direction from the image processing apparatus 101B.

The image processing apparatuses 101A and 100B may include a distance sensor. In this case, for example, when the search object is included in the field-of-view image 205B, the specification unit 212A may specify the location of the search object based on the location (or the location and the attitude) of the image processing apparatus 101B and the distances between the image processing apparatus 101B and the search object. In this way, the location of the search object can be specified more accurately than specifying the location of the search object only based on the location (or the location and the attitude) of the image processing apparatus 101B.

Figure 6:
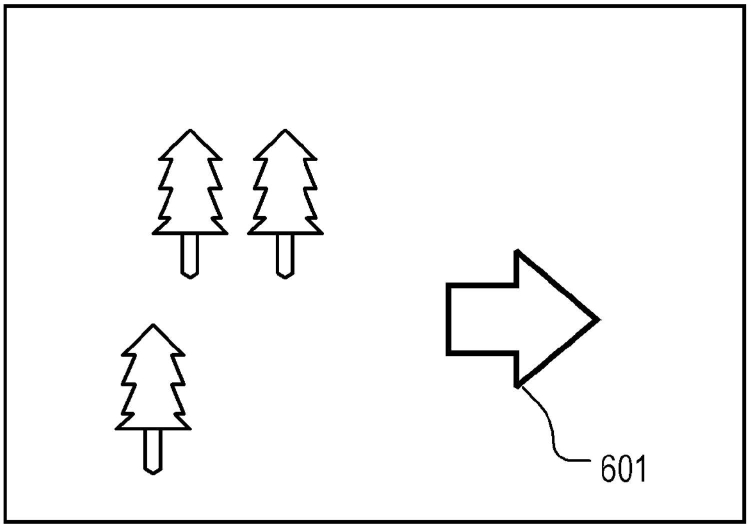
FIG. 6 is a diagram illustrating an example of an XR item according to Embodiment 1.

Alternatively, in step S507, the specification unit 212A may specify (calculate) the relative location of the search object viewed from the requester by comparing the location information 209A indicating the location of the image processing apparatus 101A with location information 209B indicating the location of the image processing apparatus 101B. In this case, for example, as illustrated in FIG. 6, the CPU 102A generates an XR item 601 used for guidance indicating the direction in which the search object exists on the basis of the relative location of the search object. The CPU 102A then displays the XR item 601 on the display unit 106A. Thus, the image processing apparatus 101A can guide the requester to the location of the search object.

In FIG. 6, the XR item 601 is an item indicating the location of the search object with respect to the location of the image processing apparatus 101A (requester). However, the XR item 601 may be an item representing a map including the location of the image processing apparatus 101A (requester) and the location of the search object (a map from the location of the image processing apparatus 101A to the location of the search object). In this case, for example, a map generation unit included in the image processing apparatus 101A generates the XR item, which is a map, based on the specified location of the search object. For example, the map generation unit can generate a map representing the locations of a plurality of products in a certain store or warehouse by specifying the locations of the plurality of products in accordance with the flowchart in FIG. 5.

(Process on Cooperator Side)

A process (a control method of the image processing apparatus 101B) in which the image processing apparatus 101B transmits a search result to the image processing apparatus 101A will be described with reference to FIG. 7. The process of the present flowchart is realized by the CPU 102B executing a control program according to the present flowchart.

Figure 7:
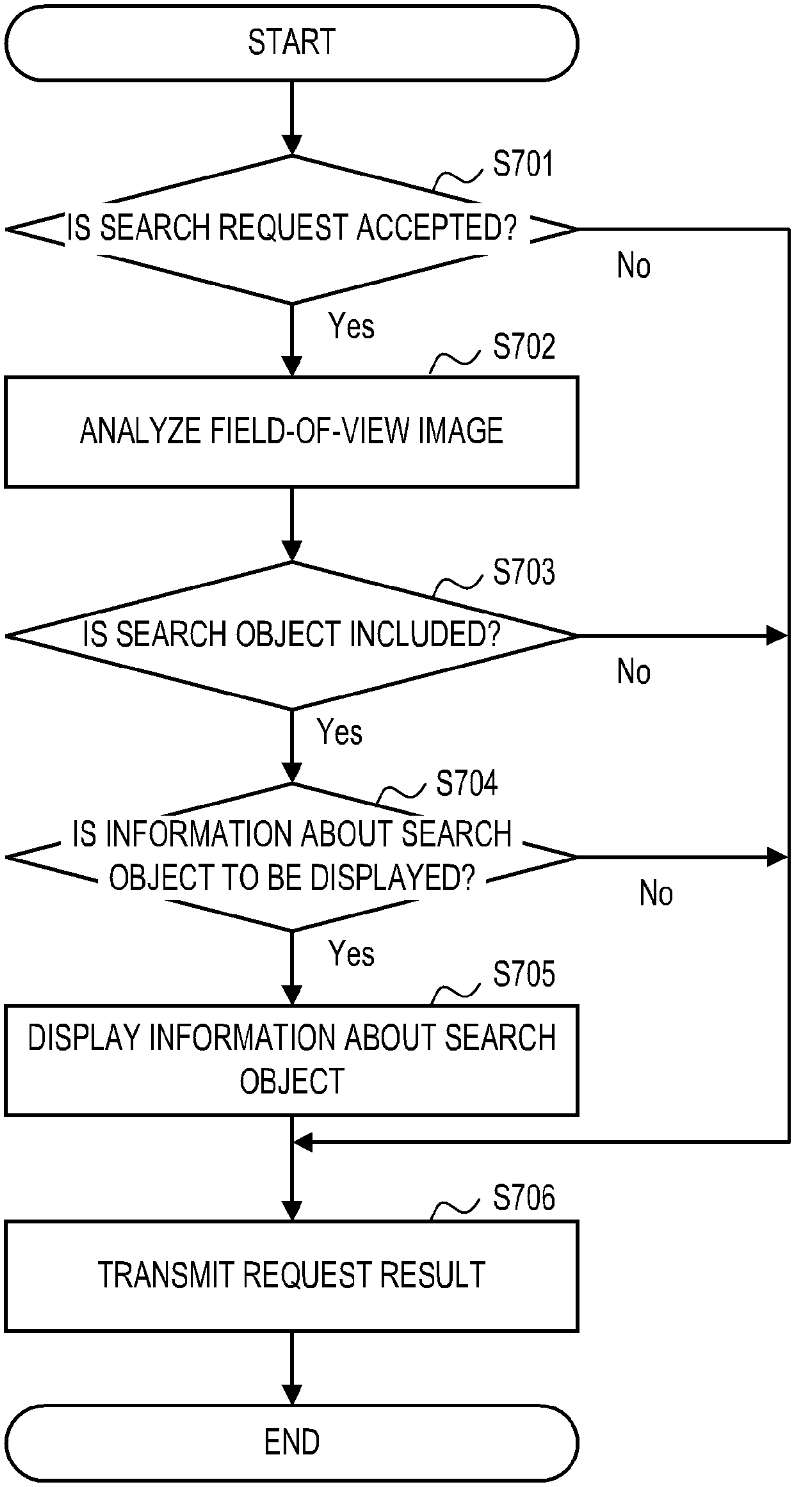
FIG. 7 is a flowchart illustrating a process performed by the image processing apparatus of the cooperator according to Embodiment 1.

The process of the flowchart in FIG. 7 starts when the request acquisition unit 301B acquires search request information 211 from the image processing apparatus 101A via the communication unit 108B. The request acquisition unit 301B stores the search request information 211 in the RAM 104B. The search request information 211 includes the target information 202 and the disclosure setting information (see FIG. 4A).

In step S701, the request determination unit 302B reads the cooperation setting information (see FIG. 4B) from the RAM 104B and determines whether or not the cooperation setting information indicates that the search request is accepted. If it is determined that the cooperation setting information indicates that the search request is accepted, the processing proceeds to step S702. If it is determined that the cooperation setting information indicates that the search request is rejected, the processing proceeds to step S706.

In step S702, the image analysis unit 206B analyzes a field-of-view image 205B captured by the imaging unit 105B to acquire an analysis result 210B. The processing in step S702 is the same as that in step S502, and the description thereof is omitted.

In step S703, the image analysis unit 206B determines whether or not the search object is included in the field-of-view image 205B based on the target information 202 and the analysis results 210B. The image analysis unit 206B then stores, in the RAM 104B, a search result 213B indicating whether or not the search object is included in the field-of-view image 205B. The processing in step S703 is the same as that in step S503. If it is determined that the search object is included in the field-of-view image 205B, the processing proceeds to step S704. If it is determined that the search object is not included in the field-of-view image 205B, the processing proceeds to step S706. Alternatively, in step S702, the image analysis unit 206B may determine whether or not the search object is included in the field-of-view image 205B by analyzing the field-of-view image 205B based on the target information 202.

In step S704, the user notification unit 303B reads the disclosure setting information and the display setting information (see FIG. 4A and FIG. 4B) from the RAM 104B. When the disclosure setting information indicates "to be disclosed" and the display setting information indicates "to be displayed", the user notification unit 303B determines that the information of the search object is to be displayed. Otherwise, the user notification unit 303B determines that the information of the search object is not to be displayed. If it is determined that the information of the search object is to be displayed, the processing proceeds to step S705. If it is determined that the information of the search object is not to be displayed, the processing proceeds to step S706.

In step S705, the user notification unit 303B displays the information of the search object on the display unit 106B. The information of the search object may be any information as long as the user (cooperator) can recognize the search object, such as information indicating the location of the search object, the target information 202, or information indicating the name of the search object.

Figure 8:
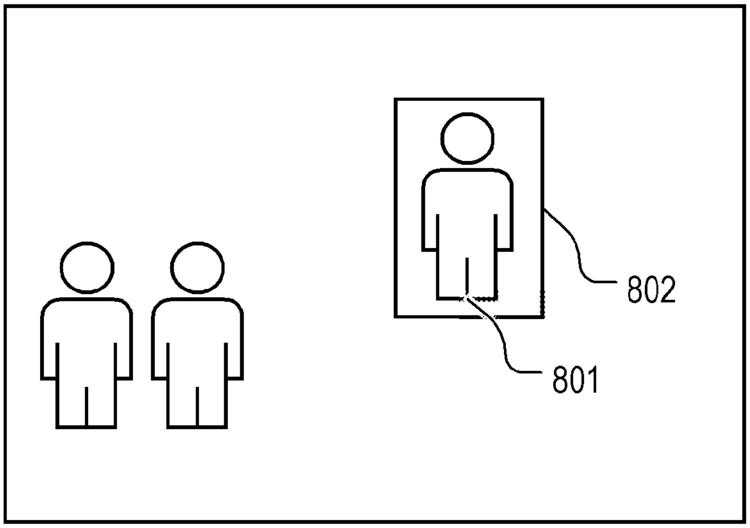
FIG. 8 is a diagram for describing user notification according to Embodiment 1.

For example, as illustrated in FIG. 8, the user notification unit 303B superimposes an XR item 802 on a search object 801 in the field-of-view image 205B. That is, the user notification unit 303B notifies the user (cooperator) of information of the search object 801 by displaying the XR item 802 indicating the location of the search object 801 on the display unit 106B. The XR item 802 is an item (display item) for highlighting the search object 801. The XR item 802 may be displayed as a frame shape as illustrated in FIG. 8 or may be displayed as a different type of emphasized expression. Further, the user notification unit 303B may display the target information 202 indicating information of the search object 801 (for example, an image or characters indicating the search object 801) on the display unit 106B. When the target information 202 is character information, the user notification unit 303B may notify the user of the information of the search object 801 by emitting a voice reading out the characters.

Figure 9:
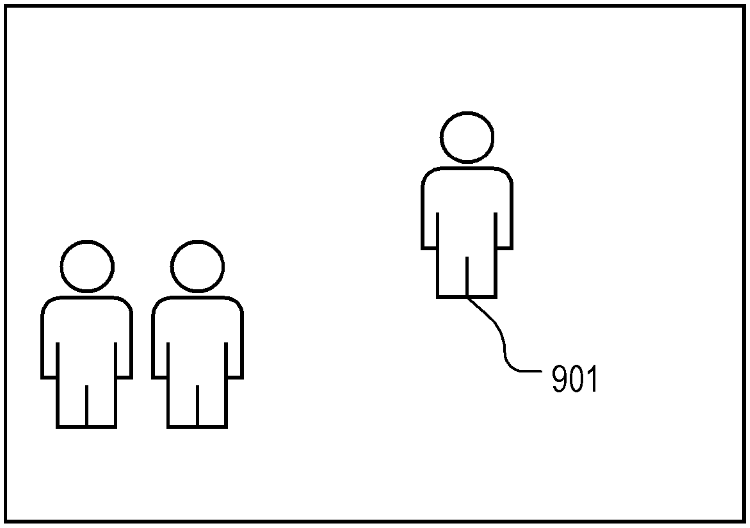
FIG. 9 is a diagram for describing user notification according to Embodiment 1.

Note that, if it is determined in step S704 that the information of the search object is not to be displayed, the XR item 802 is not displayed on the display unit 106B as illustrated in FIG. 9 even if a search object 901 is included in the field-of-view image 205B.

In step S706, the request response unit 304B transmits a request result 214 to the image processing apparatus 101A. The request result 214 includes acceptance/rejection information 305B, the search result 213B, and the location information 209B of the image processing apparatus 101B. The location information 209B indicates a location of the image processing apparatus 101B at a time when the imaging unit 105B has acquired the field-of-view image 205B through image capturing. Since the location acquisition unit 208B stores the location information 209B in the RAM 104B, the request response unit 304B can acquire the location information 209B from the RAM 104B. The request result 214 may include attitude information of the image processing apparatus 101B. The attitude information indicates an attitude of the image processing apparatus 101B at a time when the imaging unit 105B has acquired the field-of-view image 205B through image capturing. When the search request is not accepted or when the search object is not included in the field-of-view image 205B, the request result 214 does not need to include the location information 209B. This is because, in such a case, the location of the search object is not specified on the basis of the location information 209B.

When the cooperation setting information indicates that the search request is rejected, the request response unit 304B transmits the acceptance/rejection information 305B indicating that the search request has been rejected to the image processing apparatus 101A. When the search object is not included in the field-of-view image 205B, the request response unit 304B transmits the search result 213B indicating that the search object is not included in the field-of-view image 205B (the search object has not been found) to the image processing apparatus 101A.

According to Embodiment 1, even when the search object is not included in the field-of-view image 205A acquired by the image processing apparatus 101A, the location of the search object can be specified if the search object is included in the field-of-view image 205B acquired by the image processing apparatus 101B. Therefore, even when the search object is present at a location distant from the location of the image processing apparatus 101A, the image processing apparatus 101A can specify the location of the search object.

In Embodiment 1, the example in which the field-of-view image 205A is displayed on the display unit 106A has been described. However, the present invention is not limited this example. For example, there is a case where the display unit 106A has a high degree of transparency and the requester can directly see the real space through the display unit 106A. In this case, the display unit 106A does not need to display the field-of-view image 205A. Unless the XR item or the like is displayed on the display unit 106A, the range viewed by the requester through such a display unit 106A is approximately the same as the range to be captured by the imaging unit 105 to acquire the field-of-view image 205A.

Further, the image processing apparatus 101B may include a specification unit 212B. In this case, when the search object is included in the field-of-view image 205B, the specification unit 212B may specify the location of the search object. Then, the request return unit 304B may transmit the information of the location of the search object to the image processing apparatus 101A.

In addition, the image processing apparatus 101B may not determine whether or not the search object is included in the field-of-view image 205B. In this case, the image processing apparatus 101B may transmit the field-of-view image 205B to the image processing apparatus 101A, instead of transmitting the search result 213B. In this case, the image analysis unit 206A of the image processing apparatus 101A determines whether or not the search object is included in the field-of-view image 205B. That is, part of the above-described processing performed by the image processing apparatus 101B may be performed by the image processing apparatus 101A, or part of the above-described processing performed by the image processing apparatus 101A may be performed by the image processing apparatus 101B.

Further, in addition to the information (character string or image) specified by the user, the target determination unit 201A may determine information associated with the information specified by the user as the target information 202. For example, when the information specified by the user is an image of a key of a warehouse and the information associated with the information specified by the user is an image of a specific shelf, the image processing apparatus 101A determines whether at least one of the key of the warehouse and the specific shelf is included in the field of view image 205A or 205B. If the key of the warehouse or the specific shelf is included in the field-of-view image 205A or 205B, the image processing apparatus 101A specifies the location of the key of the warehouse or the specific shelf. In this case, the key of the warehouse and the specific shelf are the search objects.

Embodiment 2

In Embodiment 1, the image processing apparatus 101A of the requester makes a search request to the image processing apparatus 101B of the cooperator. According to Embodiment 1, the search for the search object can be performed (the location of the search object can be specified) by using not only the field-of-view image 205A acquired by the image processing apparatus 101A through image capturing but also the field-of-view image 205B acquired by the image processing apparatus 101B through image capturing. However, in Embodiment 1, the field-of-view image 205B is the image acquired at the time when the image processing apparatus 101B has received the search request, and therefore, the field-of-view image 205B that has previously been acquired cannot be used for the search.

In view of the foregoing, in Embodiment 2, analysis results 210B of field-of-view images 205B that have previously been acquired are accumulated in a server, and an image processing apparatus 101A of a requester makes a search request to the server. The server is, for example, a local 5G network server or a mobile edge computing (MEC) server. Since the server accumulates the analysis results 210B, the image processing apparatus 101A can search for a search object (specify the location of a search object) based on the previously-acquired field-of-view images 205B.

Figure 10:
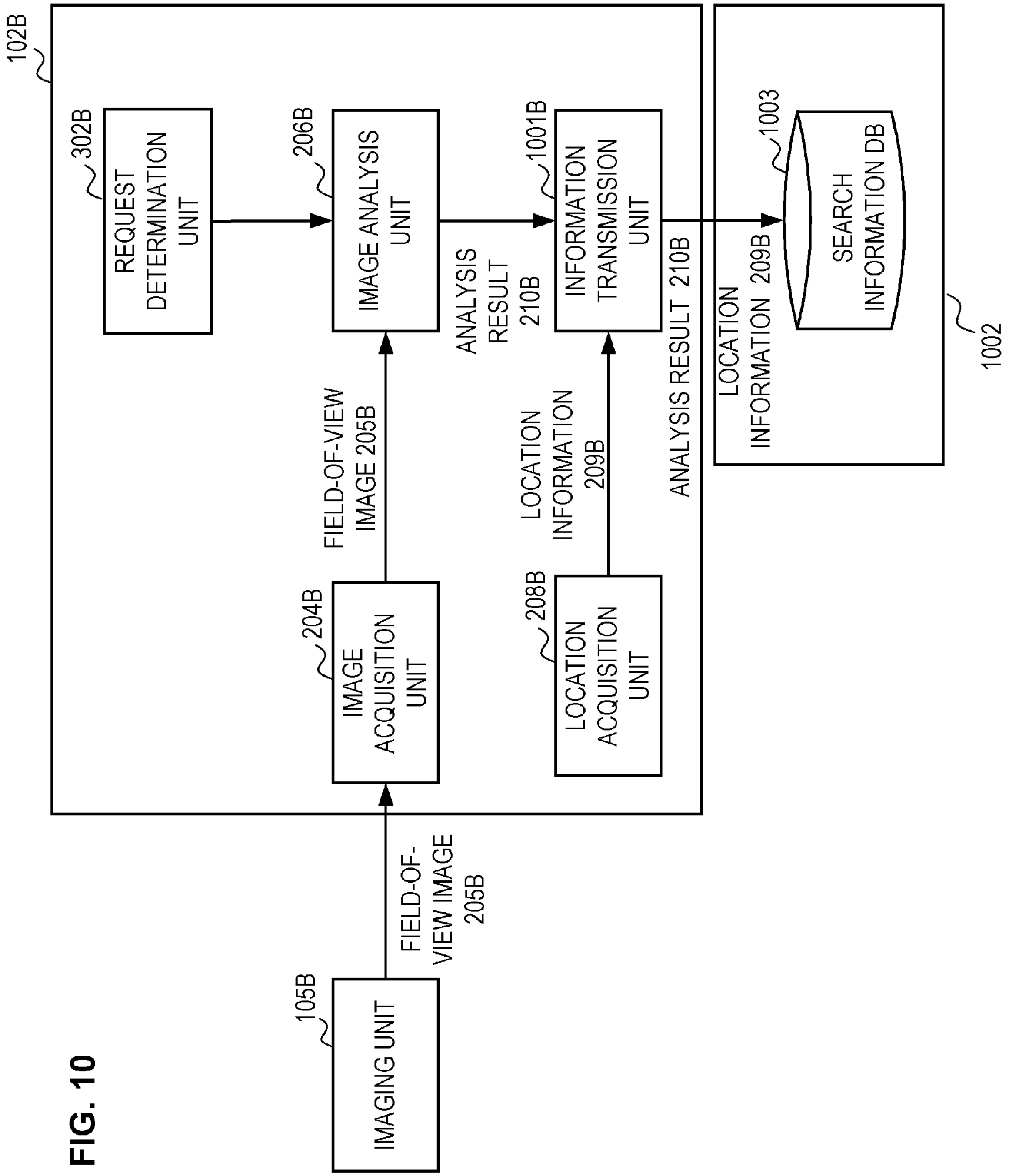
FIG. 10 is a diagram illustrating a functional configuration of an information processing apparatus of a cooperator and a server according to Embodiment 2.

FIG. 10 is a block diagram illustrating a functional configuration of a CPU 102B of the image processing apparatus 101B and a functional configuration of a server 1002 according to Embodiment 2. The CPU 102B of the image processing apparatus 101B according to Embodiment 2 includes, as the functional configuration, an image acquisition unit 204B, an image analysis unit 206B, a location acquisition unit 208B, a request determination unit 302B, and an information transmission unit 1001B. In the following description, description of the functional configuration that has been described in Embodiment 1 will be omitted.

When an imaging unit 105B has acquired a field-of-view image 205B through image capturing, the information transmission unit 1001B transmits location information 209B corresponding to the field-of-view image 205B and an analysis result 210B corresponding to the field-of-view image 205B to the server 1002.

The server 1002 is an electronic apparatus including a search information DB 1003. The server 1002 is, for example, a local 5G network server or an MEC server.

The search information DB 1003 is a database in which the location information 209B and the analysis result 210B transmitted from the image processing apparatus 101B are accumulated.

Figure 11:
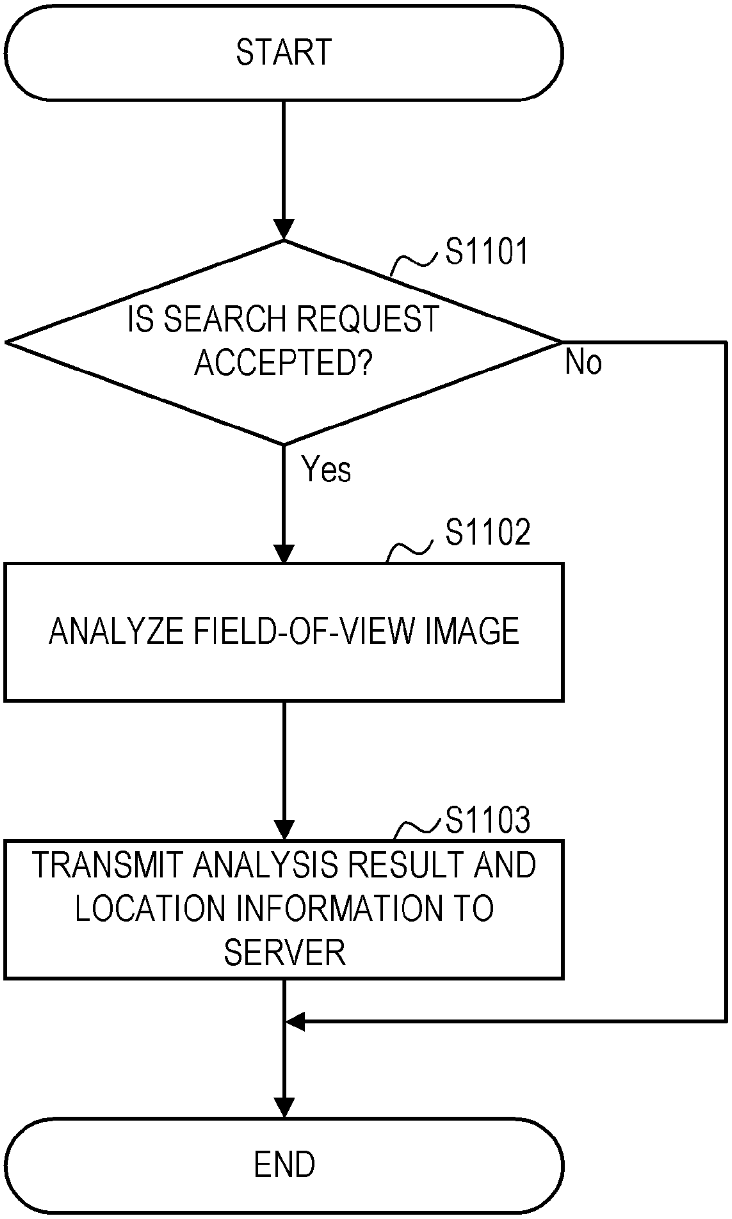
FIG. 11 is a flowchart illustrating a process for transmitting an analysis result transmission process according to Embodiment 2.

FIG. 11 is a flowchart illustrating a process in which the image processing apparatus 101B transmits the analysis result 210B and the location information 209B to the server 1002. The process of the present flowchart is realized by the CPU 102B executing a control program according to the present flowchart. The process of the present flowchart starts when the image processing apparatus 101B is connected to a network (local 5G network or the like).

In step S1101, the request determination unit 302B determines whether or not the cooperation setting information indicates that the search request is accepted. If it is determined that the cooperation setting information indicates that the search request is accepted, the processing proceeds to step S1102. If it is determined that the cooperation setting information indicates that the search request is rejected, the process of the present flowchart ends.

In step S1102, the image acquisition unit 204B acquires the field-of-view image 205B from the imaging unit 105B. The image analysis unit 206B analyzes the field-of-view image 205B to determine subjects included in the field-of-view image 205B. The image analysis unit 206B stores information of the subjects determined to be included in the field-of-view image 205B in the RAM 104B as an analysis result 210B.

In step S1103, the information transmission unit 1001B transmits the location information 209B and the analysis result 210B to the server 1002. Thus, the location information 209B and the analysis result 210B are stored in the search information DB1003 in the server 1002. The information transmission unit 1001 may transmit the location information 209B and the analysis result 210B to the server 1002 at a timing when the transmission is requested by the server or in accordance with a time interval set by the cooperator.

Figure 5:
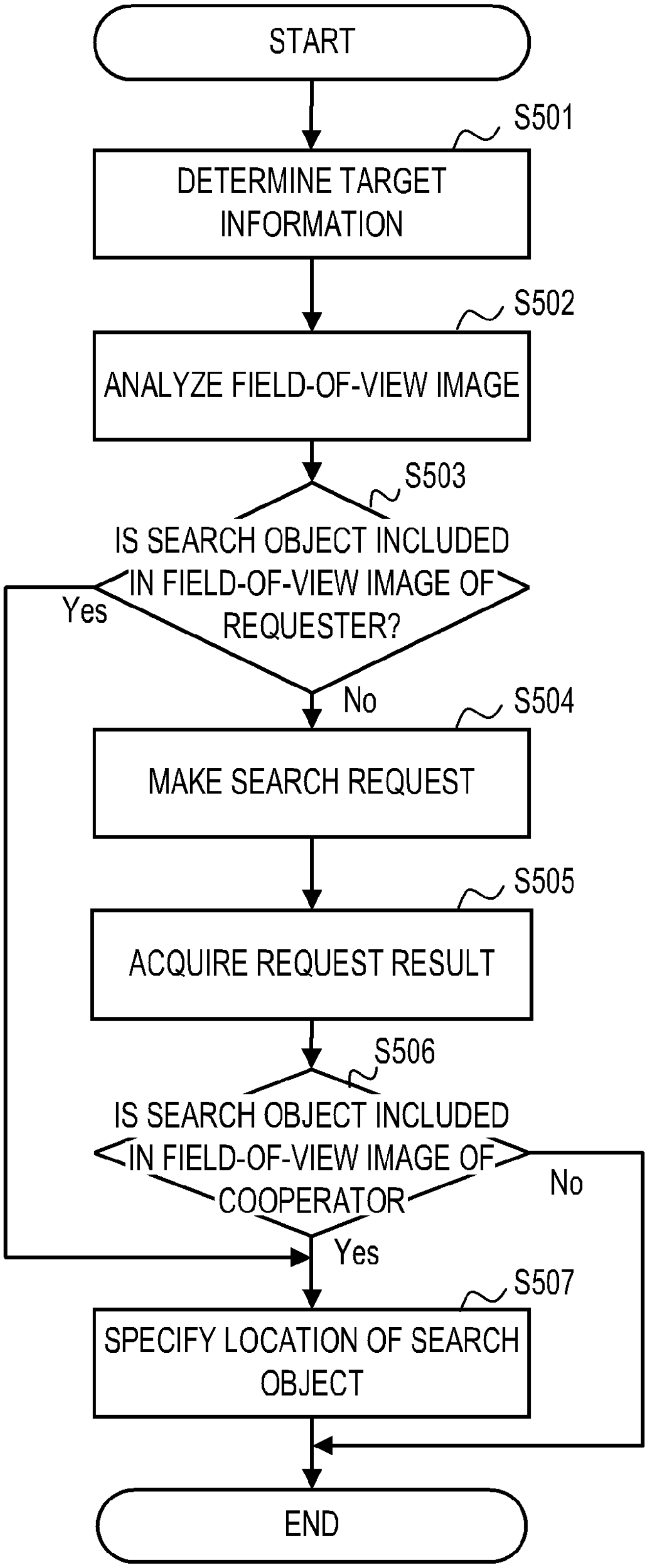
FIG. 5 is a flowchart illustrating a process performed by the image processing apparatus of the requester according to Embodiment 1.

The process performed by the image processing apparatus 101A is the same as the process illustrated in FIG. 5, and therefore, the description thereof is omitted. However, the peer to which the search request unit 203A makes the search request in step S504 is not the image processing apparatus 101B but the server 1002. Thus, when the server 1002 receives the search request information 211, the server 1002 performs the same processing as that in step S703 in FIG. 7 based on the analysis result 210B and transmits a request result 214 to the image processing apparatus 101A as in step S706. Therefore, the server 1002 may have a functional configuration similar to all or at least part of the functional configuration of the image processing apparatus 101B illustrated in FIG. 3. The request result 214 may always include acceptance/rejection information 305 indicating that the search request has been accepted or may not include the acceptance/rejection information 305.

According to Embodiment 2, a search can be performed on the field-of-view image 205B previously acquired by the imaging unit 105B of the image processing apparatus 101B. Thus, for example, even when the search object is not present in any of the field-of-view image 205A and the field-of-view image 205B at the current time point, the location where the search object has previously been present can be specified.

In addition, the information transmission unit 1001 may transmit the field-of-view image 205B to the server 1002, instead of transmitting the analysis result 210B. In this case, the field-of-view image 205B may be analyzed in the server 1002.

Further, the information transmission unit 1001 may transmit time information indicating the time (imaging-capturing time) at which the imaging unit 105B has acquired the field-of-view image 205B through image capturing, together with the analysis result 210B and the location information 209B. The server 1002 accumulates the time information together with the analysis result 210B and the location information 209B. In this case, when the server 1002 receives the search request information 211, the server 1002 transmits the request result 214 including the time information to the image processing apparatus 101A. Next, for example, after specifying the location of the search object, the CPU 102A of the image processing apparatus 101A displays an item representing the time indicated by the time information (that is, the time at which the presence of the search object has been confirmed) on the display unit 106A together with the XR item indicating the information of the search object. In this way, for example, even when the search object is not present at the specified location of the search object, since the requester knows the time indicated by the time information, the requester can estimate, based on the indicated time, a location to which the search object is likely to have moved between the indicated time and the current time.

The embodiments described above are all illustrative embodiments of the present invention and are not intended to limit the present invention, and the present invention can be implemented by using other various modified modes and altered modes.

Each functional unit of each embodiment (each modification) described above may be realized by separate hardware, but not limited thereto. The functions of two or more functional units may be implemented by common hardware. Each of the plurality of functions of one functional unit may be implemented by separate hardware. Two or more functions of one functional unit may be implemented by common hardware. Each functional unit may be realized by hardware such as an ASIC, an FPGA, or a DSP, but not limited thereto. For example, the apparatus may include a processor and a memory (storage medium) in which a control program is stored. The function of at least a part of the functional units included in the apparatus may be realized by the processor reading and executing the control program in the memory.

According to the present invention, even when a search object is not included in a captured image acquired by a specific electronic apparatus, the location of the search object can easily be specified.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited by the embodiments described above, and various changes and modifications can be made without departing from the spirit and scope of the present invention. Accordingly, the following claims are appended to disclose the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An electronic apparatus serving as a first apparatus, the electronic apparatus comprising at least one processor capable of causing the electronic apparatus to:

transmit search request information including information of a search object;

acquire (1) location information indicating a location of a second apparatus at a time when the second apparatus has acquired a captured image through image capturing and (2) attitude information indicating an attitude of the second apparatus at a time when the second apparatus has acquired the captured image; and in case where the search object is included in the captured image, (1) determine an optical axis direction of an imaging device of the second apparatus based on the attitude information and (2) specify a location of the search object in the optical axis direction from a location of the second apparatus, wherein the search request information includes disclosure setting information indicating whether or not to display the information of the search object on a display of the second apparatus.

2. The electronic apparatus according to claim 1, wherein the at least one processor is capable of causing the electronic apparatus to:

transmit the search request information to the second apparatus; and acquire the location information from the second apparatus.

3. The electronic apparatus according to claim 1, wherein the captured image is an image that has previously been acquired by the second apparatus, and wherein the at least one processor is capable of causing the electronic apparatus to:

(1) transmit the search request information to a server, and (2) acquire the location information from the server.

4. The electronic apparatus according to claim 1, wherein the information of the search object is information of a character string specified by a user of the electronic apparatus.

5. The electronic apparatus according to claim 4, wherein the at least one processor is capable of causing the electronic apparatus to emit a voice reading out the character string.

6. The electronic apparatus according to claim 1, wherein the information of the search object is information of an image specified by a user of the electronic apparatus.

7. The electronic apparatus according to claim 1, wherein the information of the search object is information estimated on a basis of a past activity history of a user of the electronic apparatus.

8. The electronic apparatus according to claim 1, further comprising a display configured to display an item indicating the location of the search object.

9. The electronic apparatus according to claim 8, wherein the item is a map including a location of the electronic apparatus and the location of the search object.

10. The electronic apparatus according to claim 8, wherein the at least one processor is capable of causing the electronic apparatus to acquire information of a time at which the captured image has been acquired, and wherein the display displays the time together with the item.

11. The electronic apparatus according to claim 1, wherein the at least one processor is capable of causing the electronic apparatus to:

acquire a distance between the second apparatus and the search object; and specify a location of the search object at a location separated by the distance in an optical axis direction from the location of the second apparatus.

12. The electronic apparatus according to claim 1, wherein in a case where the search object is included in a field-of-view image acquired by imaging a field of view of a user of the first apparatus, the at least one processor does not cause the electronic apparatus to transmit the search request information.

13. The electronic apparatus according to claim 1, wherein the search object is an object associated with information specified by a user.

14. An electronic apparatus serving as a second apparatus, the electronic apparatus comprising at least one processor capable of causing the electronic apparatus to:

acquire search request information including information of a search object from a first apparatus;

determine, based on the information of the search object, whether or not the search object is included in a captured image acquired by the second apparatus through image capturing; and transmit location information to the first apparatus, in a case where it is determined that the search object is included in the captured image, the location information indicating a location of the second apparatus at a time when the second apparatus has acquired the captured image, wherein the search request information includes disclosure setting information indicating whether or not the information of the search object is to be disclosed to a user of the second apparatus, wherein the user of the second apparatus is able to set a setting to display the information of the search object, and wherein the at least one processor is capable of causing the electronic apparatus to display the information of the search object on a display of the second apparatus in a case where (1) the disclosure setting information indicates that the information of the search object is to be disclosed to the user of the second apparatus and (2) the user of the second apparatus sets a setting to display the information of the search object.

15. A control method of an electronic apparatus serving as a first apparatus, the control method comprising steps of:

transmitting search request information including information of a search object;

acquiring (1) location information indicating a location of a second apparatus at a time when the second apparatus has acquired a captured image through image capturing and (2) attitude information indicating an attitude of the second apparatus at a time when the second apparatus has acquired the captured image; and in case where the search object is included in the captured image, (1) determining an optical axis direction of an imaging device of the second apparatus based on the attitude information and (2) specifying a location of the search object in the optical axis direction from a location of the second apparatus, wherein the search request information includes disclosure setting information indicating whether or not to display the information of the search object on a display unit of the second apparatus.

16. A non-transitory computer-readable medium storing thereon a program for causing a computer to execute the control method according to claim 15.

17. A control method of an electronic apparatus serving as a second apparatus, the control method comprising steps of:

acquiring search request information including information of a search object from a first apparatus;

determining, based on the information of the search object, whether or not the search object is included in a captured image acquired by the second apparatus through image capturing; and transmitting location information to the first apparatus, in a case where the determining determines that the search object is included in the captured image, the location information indicating a location of the second apparatus at a time when the second apparatus has acquired the captured image, wherein the search request information includes disclosure setting information indicating whether or not the information of the search object is to be disclosed to a user of the second apparatus, wherein a user of the second apparatus is able to set a setting to display the information of the search object, and wherein the information of the search object is displayed on a display of the second apparatus in case where (1) the disclosure setting information indicates that the information of the search object is to be disclosed to the user of the second apparatus and (2) the user of the second apparatus sets a setting to display the information of the search object.

18. A non-transitory computer-readable medium storing thereon a program for causing a computer to execute the control method according to claim 17.

* * * * *